US008517585B1

(12) United States Patent
Bezel et al.

(10) Patent No.: US 8,517,585 B1
(45) Date of Patent: Aug. 27, 2013

(54) FULL NUMERICAL APERTURE PUMP OF LASER-SUSTAINED PLASMA

(75) Inventors: Ilya Bezel, Sunnyvale, CA (US); Anatoly Shchemelinin, Pleasanton, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 307 days.

(21) Appl. No.: 13/165,924

(22) Filed: Jun. 22, 2011

Related U.S. Application Data

(60) Provisional application No. 61/360,483, filed on Jun. 30, 2010.

(51) Int. Cl.
*G02B 6/02* (2006.01)
*H01S 3/00* (2006.01)

(52) U.S. Cl.
USPC ..... 362/553; 362/259; 250/504 R; 250/493.1; 250/494.1

(58) Field of Classification Search
USPC ............... 362/553, 259, 227, 19; 250/504 R, 250/493.1, 494.1
See application file for complete search history.

(56) References Cited

U.S. PATENT DOCUMENTS

| | | | | |
|---|---|---|---|---|
| 4,530,600 | A * | 7/1985 | Lopez | 356/5.14 |
| 7,476,886 | B2 * | 1/2009 | Bykanov et al. | 250/504 R |
| 7,705,331 | B1 | 4/2010 | Kirk et al. | |
| 7,872,245 | B2 * | 1/2011 | Vaschenko et al. | 250/492.2 |
| 2007/0228288 | A1 | 10/2007 | Smith | |
| 2007/0228300 | A1 | 10/2007 | Smith | |
| 2008/0048133 | A1 * | 2/2008 | Bykanov et al. | 250/504 R |
| 2010/0027571 | A1 * | 2/2010 | Murdoch | 372/22 |
| 2012/0026749 | A1 * | 2/2012 | Armstrong | 362/553 |
| 2012/0267553 | A1 * | 10/2012 | Nagai et al. | 250/504 R |

* cited by examiner

*Primary Examiner* — Bao Q Truong

(74) *Attorney, Agent, or Firm* — Luedeka Neely Group, P.C.; Rick Barnes

(57) ABSTRACT

A laser-sustained light source having a first laser source for providing a first beam portion having a first characteristic, a second laser source for providing a second beam portion having a second characteristic, where the first characteristic is different from the first characteristic, first optics that are reflective to the first characteristic and transmissive of the second characteristic, for reflecting the first beam portion along a first path into a reflection optics and through a cell to sustain a plasma, second optics that are reflective to the second characteristic and transmissive of the first characteristic, for reflecting the second beam portion along a second path into the reflection optics and through the cell to sustain the plasma, the first path exiting to the second optics, where the first beam is transmitted through the second optics and into a beam dump, and the second path exiting to the first optics, where the second beam is transmitted through the first optics and into the beam dump.

7 Claims, 6 Drawing Sheets

FULL NUMERICAL APERTURE PUMP OF LASER-SUSTAINED PLASMA

This application claims all rights and priority on prior pending U.S. provisional patent application Ser. No. 61/360,483 filed 2010.06.30. This invention relates to the field of laser-sustained light sources. More particularly, this invention relates to reducing damage to the laser used to sustain the light source.

FIELD

Introduction

Laser-sustained plasma light sources function by stimulating a plasma in a gas that is contained within an environment, such as a glass cell. The plasma is sustained by a so-called pump laser that is focused to a small spot within the cell. The brightness and size of the plasma in the cell generally grows larger as the power of the pump laser increases. A larger plasma generally is not wanted, while a brighter plasma is. A high numerical aperture pump geometry can be used to keep the size of the plasma smaller as the power of the pump laser is increased, thus generally resulting in a smaller, brighter light source. Reflection optics can be used to provide a high solid reflection angle for the pump laser, thereby increasing the efficiency of the delivery of laser power to the plasma.

However, the reflection optics can cause damage to the laser source as a result of the back-reflection of the pump laser, as depicted in FIG. 1. As depicted, laser light is delivered to the light source 100 such as along fiber optic 102, and reflects off of the mirror 106 as incoming light 108 through the cold mirror 104 and into the reflector 110. The reflector 110 reflects the incoming light 108 as outgoing light 116, which is focused into the cell 112, where a plasma 114 is ignited, and sustained by the laser light 116, producing desired light 120 from the light source 100. The outgoing laser light 116 is again reflected off the reflector 110, passes back through the cold mirror 104, and bounces back off of the mirror 106, directly back into the laser optics 102. The outgoing light 116 that returns to the laser optics 102 in this manner is referred to as back-reflected light, and tends to damage the laser optics 102.

To prevent the back-reflected light 116 from damaging the optics 102, the solid angle of the reflection optics 110 (depicted as hatching) can be reduced from the full angle as depicted in FIG. 1 to something less than about 2π steradians. This reduces the damage to the optics 102, but also dramatically reduces the efficiency of the light source 100, because a lesser amount of the incoming light 108 is delivered to the plasma 114.

Alternately, an aperture 118 is used to block some of the laser light 116 that is reflected back to the fiber source 102, as depicted in FIG. 2. However, the aperture 118 also reduces the amount of laser light 108 delivered by the laser source 102, thereby again reducing the solid angle, such as depicted by the reduced hatching, and again reducing the efficiency of the light source 100.

What is needed, therefore, is a more efficient laser-sustained plasma light source that doesn't damage the laser due to back-reflection.

SUMMARY OF THE CLAIMS

The above and other needs are met a laser-sustained light source having a first laser source for providing a first beam portion having a first characteristic, a second laser source for providing a second beam portion having a second characteristic, where the first characteristic is different from the first characteristic, first optics that are reflective to the first characteristic and transmissive of the second characteristic, for reflecting the first beam portion along a first path into a reflection optics and through a cell to sustain a plasma, second optics that are reflective to the second characteristic and transmissive of the first characteristic, for reflecting the second beam portion along a second path into the reflection optics and through the cell to sustain the plasma, the first path exiting to the second optics, where the first beam is transmitted through the second optics and into a beam dump, and the second path exiting to the first optics, where the second beam is transmitted through the first optics and into the beam dump.

In this manner, the full numerical aperture of the reflection optics can be used to drive the plasma, but the outgoing laser beams are not back-reflected into the laser source(s). In this manner, a highly efficient light source is created without sustaining any damage to the laser source(s).

In various embodiments, the first beam portion and the second beam portion are separate annular components of a single light beam. Alternately, the first beam portion and the second beam portion are separate azimuthal components of a single light beam.

In some embodiments, the first characteristic is a first wavelength and the second characteristic is a second wavelength. Alternately, the first characteristic is a first polarization and the second characteristic is a second polarization. In some embodiments, the first optics and the second optics are separate annular components of a single optical element. Alternately, the first optics and the second optics are separate azimuthal components of a single optical element.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

According to the present embodiments, different wavelengths of light 108 from the pump laser 102 are shaped in the numerical aperture space such that the back-reflection 116 can be separated, such as by using dichroic optics. Alternately, polarization can be used instead of wavelength to separate the incoming light 108 from the outgoing light 116.

Figure 1:
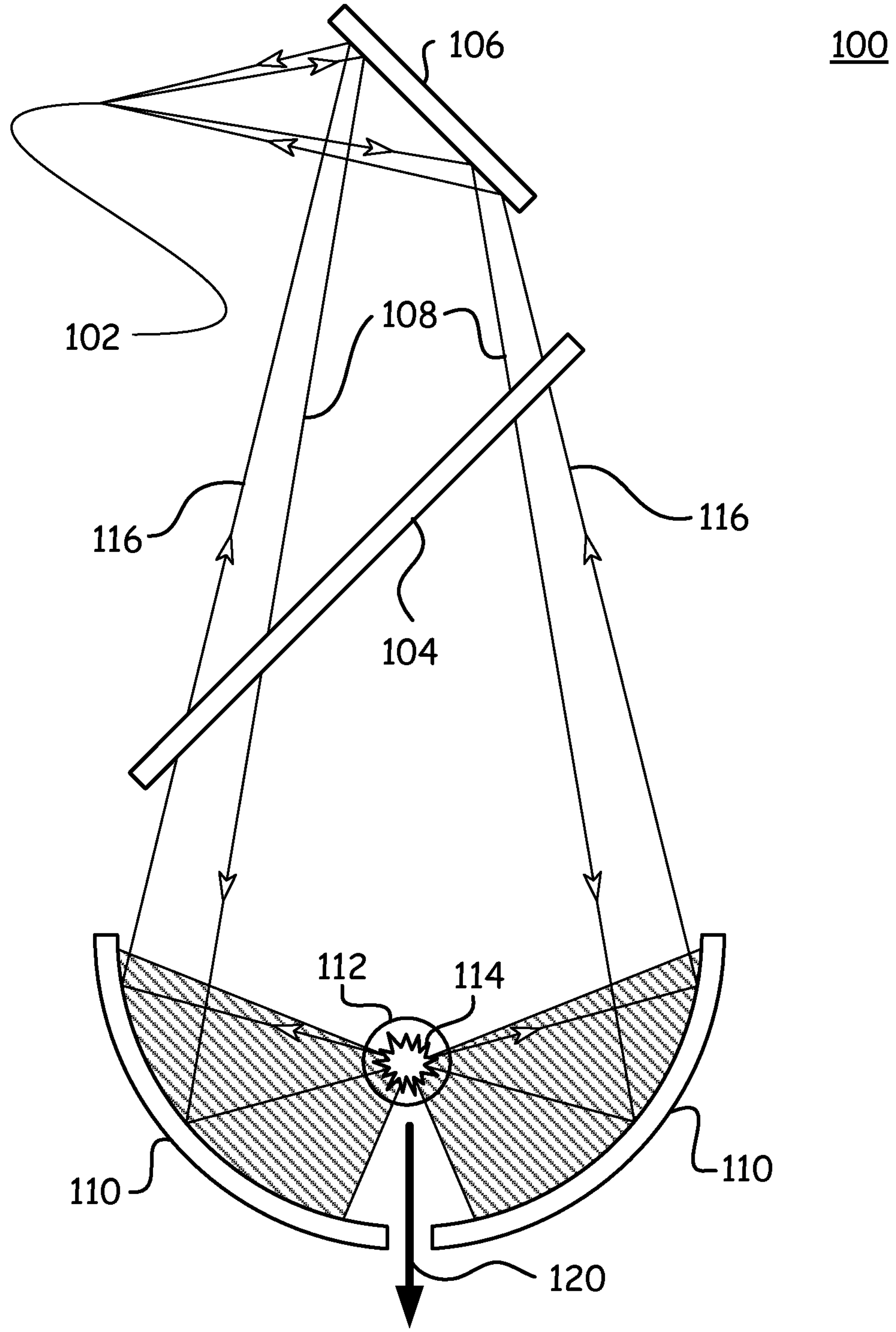
Fig. 1 (Prior Art)
FIG. 1 depicts a prior art light source where the laser light is reflected back to the light source, resulting in optical damage to the laser.
Figure 2:
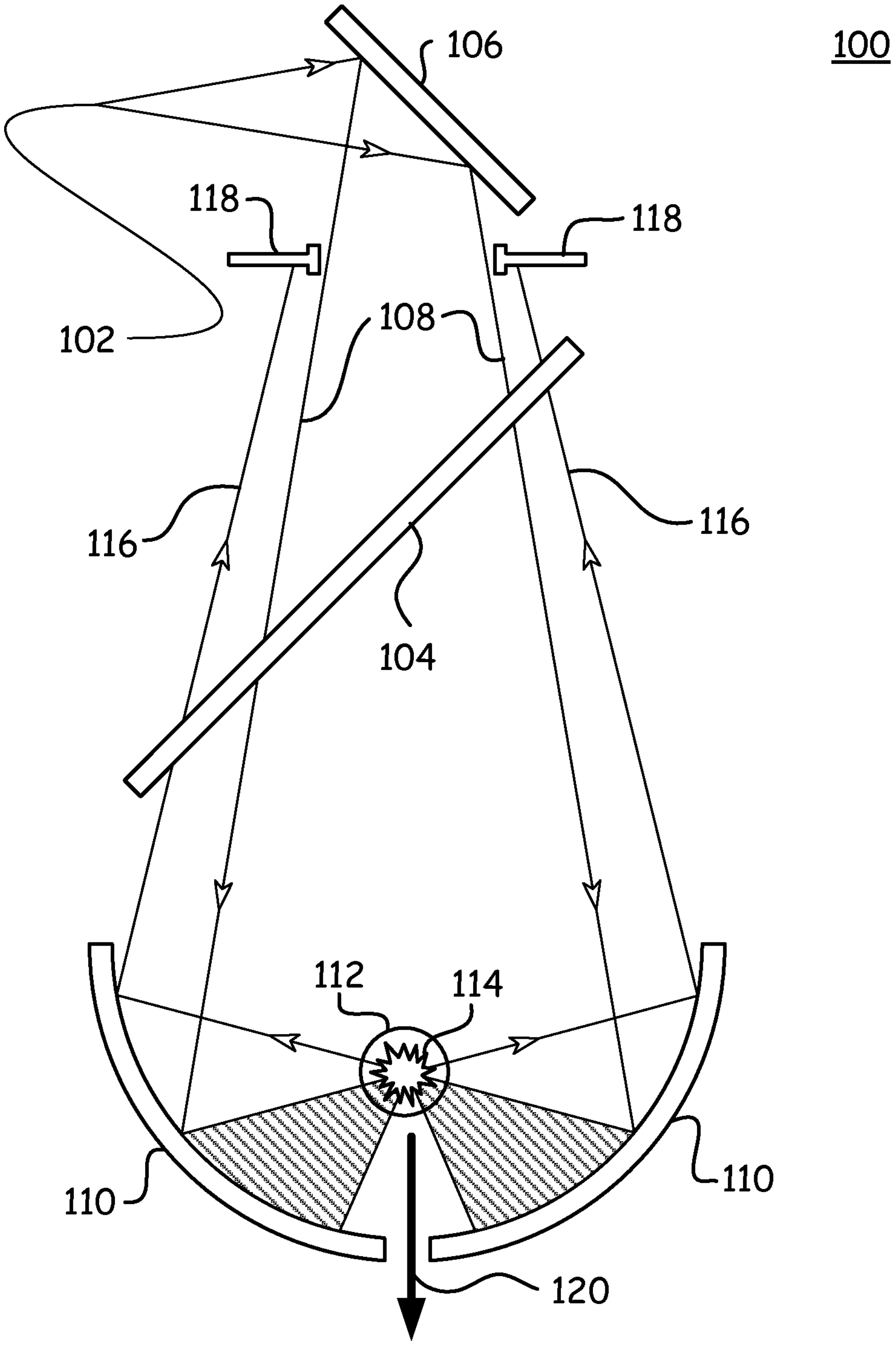
Fig. 2 (Prior Art)
FIG. 2 depicts a prior art light source where an aperture is used to limit the laser light that is reflected back to the light source.
Figure 3:
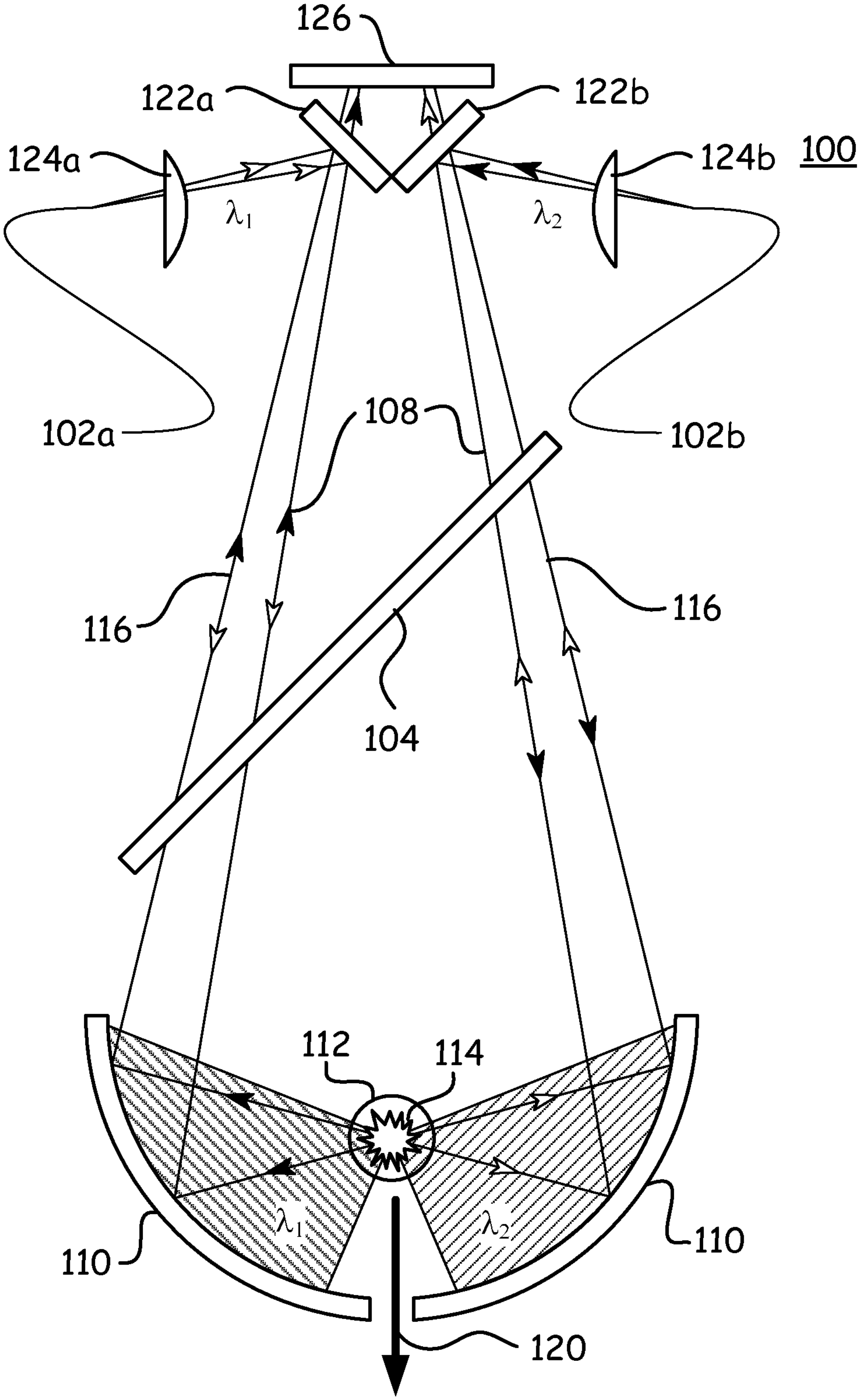
FIG. 3 depicts a light source according to an embodiment of the present invention, where the reflected light passes through a dichroic minor and is not able to return to the light source.

Such a light source 100 is depicted in FIG. 3. Twin laser sources 102*a* and 102*b* are used, and directed through shaping optics 124. Laser source 102*a* has a wavelength of $\lambda_1$, and laser source 102*b* has a wavelength of $\lambda_2$. The incoming beams 108 are reflected off dichroic mirrors 122*a* and 122*b*, and then down into the reflectors 110 and so forth as previously described. However, the dichroic minors 122*a* and 122*b* and selected such that they reflect the wavelength of the incoming light 108, but pass to a dump 126 the wavelength of the outgoing light 116. For example, dichroic minor 122*a* reflects the incoming light 108 from the first laser source 102*a* with a wavelength of $\lambda_1$, but when the outgoing light 116 from the laser source 102*b* with a wavelength of $\lambda_2$ comes back, it passes that light to the dump 126. In this manner, none of the outgoing light 116 is back-reflected to the laser sources 102, and the full numerical aperture of the reflection optics 110 can be used, thereby increasing the efficiency of the light source 100. This same result can be obtained using a characteristic of the incoming light 108 other than wavelength, such as polarization.

Figure 4:
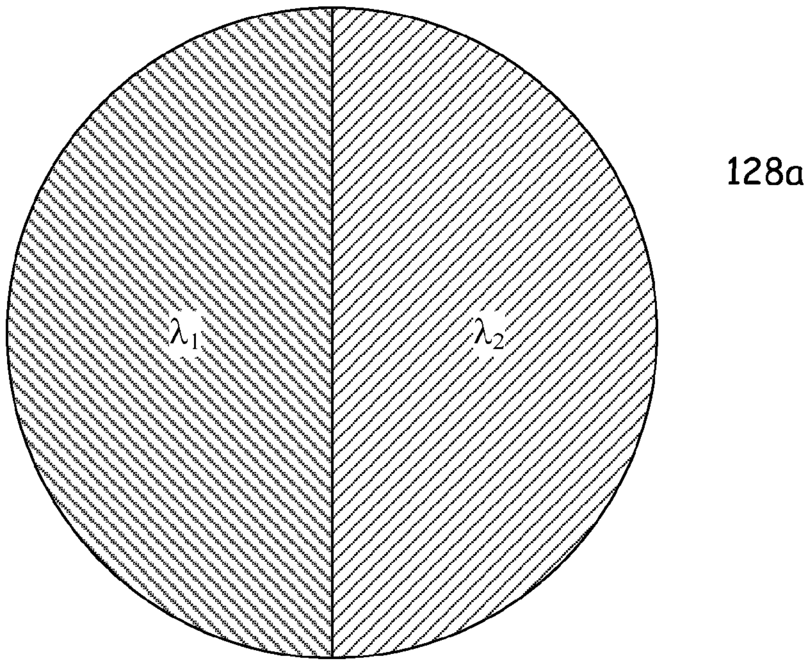
FIG. 4 depicts azimuthal separation of light having different characteristics, according to an embodiment of the present invention.

The desired spatial separation of the incoming light 108 does not need to be accomplished by having two different laser sources 102. In alternate embodiments, this spatial separation can be achieved in the incoming beam 108 itself, such as either azimuthally as depicted in the beam cross-section 128*a* of FIG. 4, or radially as depicted in the beam cross-section 128*b* of FIG. 5. It is appreciated that the incoming light 108 could be separated into more than the two portions indicated in the drawings, based on the characteristic of the light that is selected for the separation process.

Figure 5:
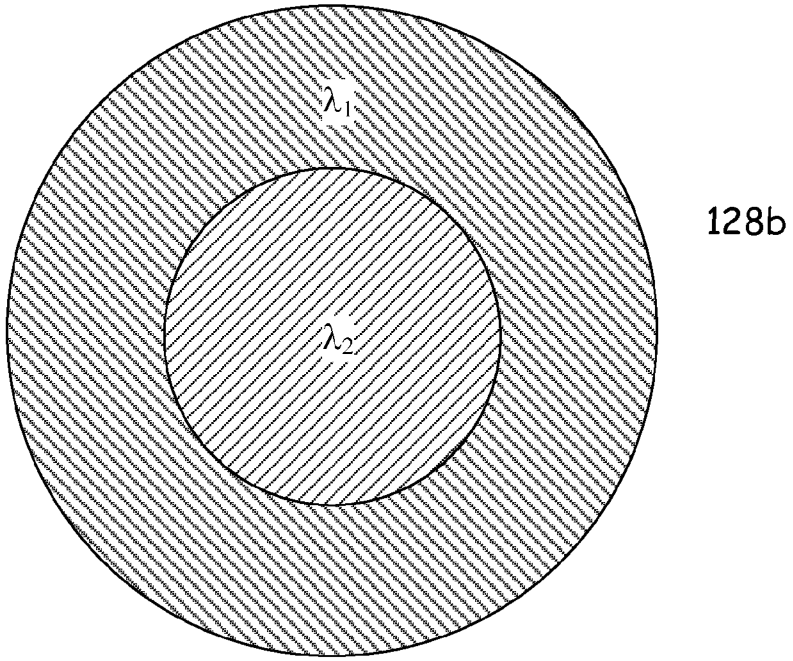
FIG. 5 depicts radial separation of light having different characteristics, according to an embodiment of the present invention.
Figure 6:
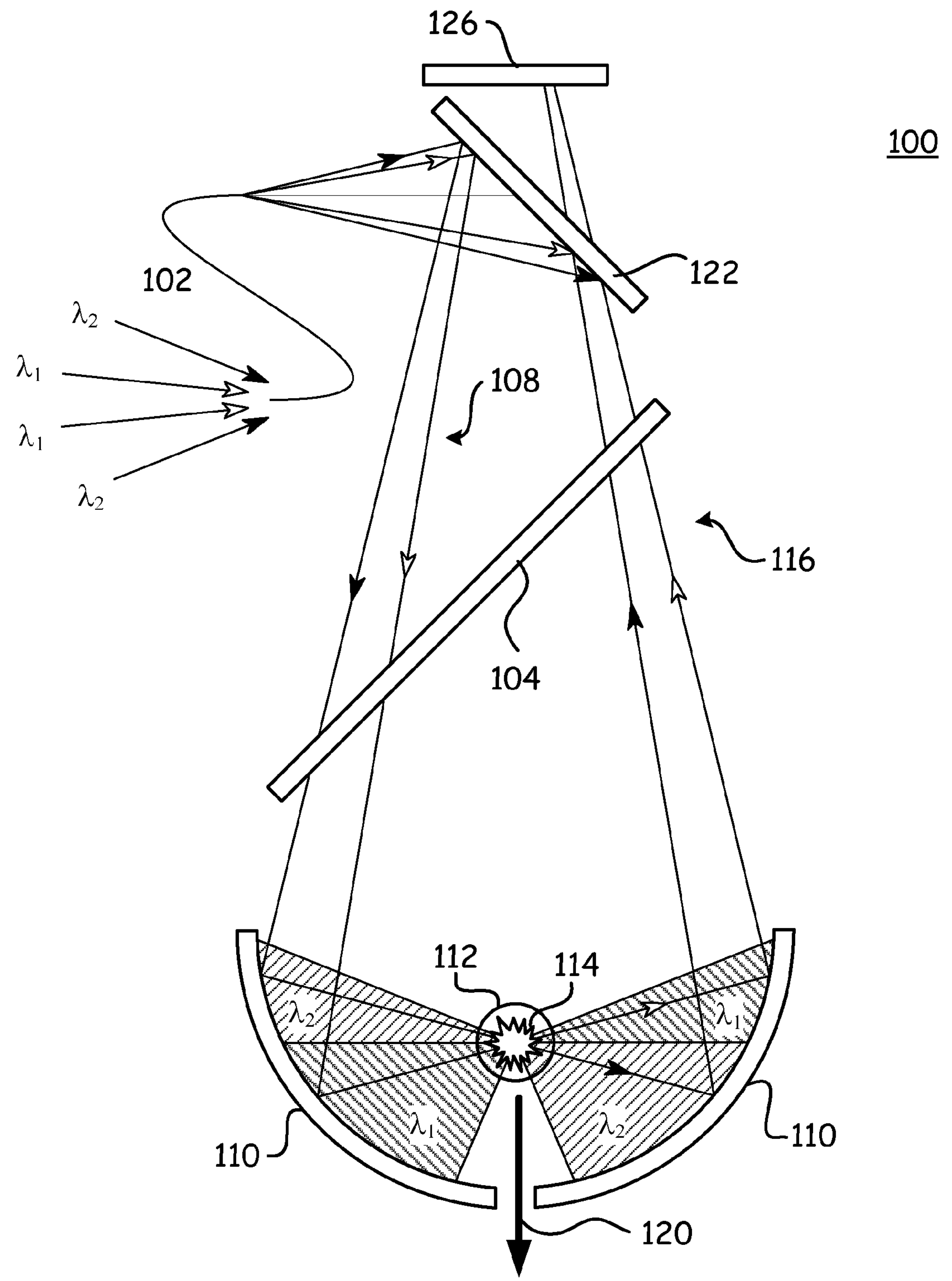
FIG. 6 depicts radial separation of light using a dichroic minor, where different wavelengths are coupled at different numerical apertures on the laser side, according to an embodiment of the present invention.

For example, in one embodiment, radial separation of the different characteristics, such as wavelengths $\lambda_1$ and $\lambda_2$, is accomplished by different couplings to the fiber 102 on the laser side, as depicted in FIG. 6. The incoming light 108 is shaped such that the light with the first wavelength is entirely (or predominantly) disposed within the annular ring as depicted in FIG. 5, and the list with the second wavelength is entirely (or predominantly) disposed within the annular ring as depicted in FIG. 5. Dichroic minor 122 is configured with a radial profile that matches the beam profile, such that the light 108 that is received hits a portion of the mirror 122 that reflects it, but light 116 returns to the dichroic mirror 122 along another path such that the portion of the minor 122 upon which it impinges passes the returning light 116 into the optical dump 126. In FIG. 6, only the light path 108 that is incoming on the left side of the diagram, and only the light path 116 that is outgoing on the right side of the diagram is depicted. However, it is appreciated that this depiction is provided so as to not unduly encumber the drawing, and that the beam is actually formed with the annular shapes as described above.

Figure 7:
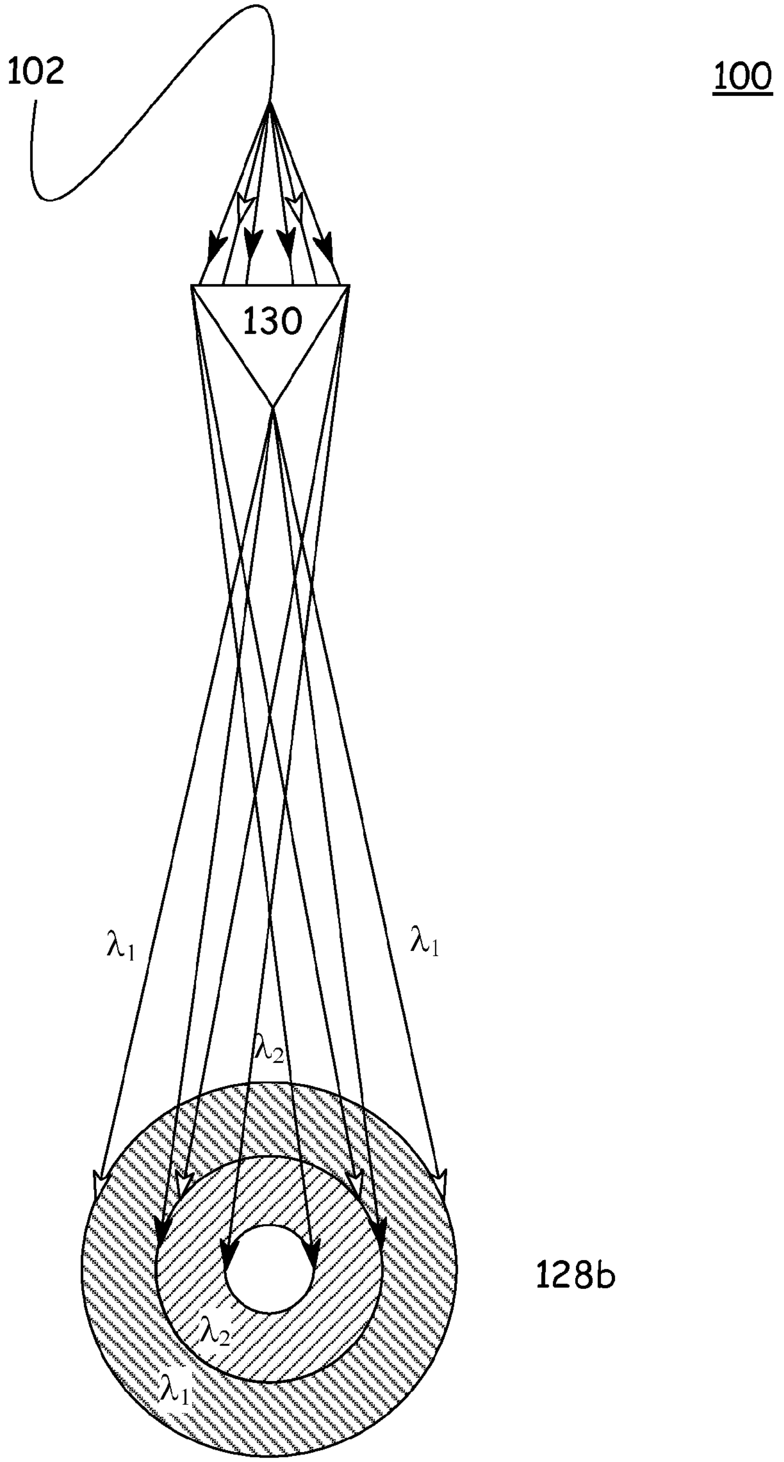
FIG. 7 depicts wavelength separation using axicones, according to an embodiment of the present invention.

In another embodiment, separation of the wavelengths is accomplished in light that is delivered through a common fiber through the use of chromatic optics 130, such as axicones, prisms, and so forth, as depicted in FIG. 7. FIG. 7 depicts the radial cross-section 128*b* that would also be achieved in the embodiment of FIG. 6, but omits the other elements of the light source 100, so as to provide this depiction of the cross-section 128.

The foregoing description of embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A laser-sustained light source, comprising:

a first laser source for providing a first beam portion having a first characteristic, a second laser source for providing a second beam portion having a second characteristic, where the first characteristic is different from the first characteristic, first optics that are reflective to the first characteristic and transmissive of the second characteristic, for reflecting the first beam portion along a first path into a reflection optics and through a cell to sustain a plasma, second optics that are reflective to the second characteristic and transmissive of the first characteristic, for reflecting the second beam portion along a second path into the reflection optics and through the cell to sustain the plasma, the first path exiting to the second optics, where the first beam is transmitted through the second optics and into a beam dump, and the second path exiting to the first optics, where the second beam is transmitted through the first optics and into the beam dump.

2. The laser-sustained light source of claim 1, wherein the first beam portion and the second beam portion are separate annular components of a single light beam.

3. The laser-sustained light source of claim 1, wherein the first beam portion and the second beam portion are separate azimuthal components of a single light beam.

4. The laser-sustained light source of claim 1, wherein the first characteristic is a first wavelength and the second characteristic is a second wavelength.

5. The laser-sustained light source of claim 1, wherein the first characteristic is a first polarization and the second characteristic is a second polarization.

6. The laser-sustained light source of claim 1, wherein the first optics and the second optics are separate annular components of a single optical element.

7. The laser-sustained light source of claim 1, wherein the first optics and the second optics are separate azimuthal components of a single optical element.

* * * * *